US011859752B2

(12) United States Patent
Giles et al.

(10) Patent No.: US 11,859,752 B2
(45) Date of Patent: Jan. 2, 2024

(54) GRIPPER ASSEMBLY FOR PIPELINE ISOLATION TOOL AND METHODS OF USE

(71) Applicant: Safe Isolations LLC, Houston, TX (US)

(72) Inventors: Paul Giles, Houston, TX (US); Humon Glenn Fardsalehi, Baton Rouge, LA (US)

(73) Assignee: SAFE ISOLATIONS LLC, Houston, TX (US)

(*) Notice: Subject to any disclaimer, the term of this patent is extended or adjusted under 35 U.S.C. 154(b) by 74 days.

(21) Appl. No.: 17/410,823

(22) Filed: Aug. 24, 2021

(65) Prior Publication Data

US 2022/0057037 A1  Feb. 24, 2022

Related U.S. Application Data

(60) Provisional application No. 63/069,349, filed on Aug. 24, 2020.

(51) Int. Cl.
| | | |
|---|---|---|
| *F16L 55/136* | (2006.01) | |
| *F16L 55/132* | (2006.01) | |
| *F16L 55/128* | (2006.01) | |

(52) U.S. Cl.
CPC ........... *F16L 55/136* (2013.01); *F16L 55/132* (2013.01); *F16L 55/1283* (2013.01)

(58) Field of Classification Search
CPC ..... B21C 1/28; B23B 31/16158; B23B 31/40; B23B 31/404; B23K 37/0531; E21B 33/1291; E21B 33/1292; E21B 33/1293; F16B 7/025; F16L 55/128; F16L 55/1283; F16L 55/132; F16L 55/136; F16L 55/44; Y10T 279/1037; Y10T 279/1041; Y10T 279/1049; Y10T 279/1054; Y10T 279/1058; Y10T 279/22
USPC .............. 82/169; 166/138; 242/573.1, 573.3, 242/573.8; 492/21
See application file for complete search history.

(56) References Cited

U.S. PATENT DOCUMENTS 1,710,902 A * 4/1929 Stachowski .......... B65H 75/242
  474/54
2,280,370 A * 4/1942 Bennett ................ B65H 75/242
  242/573.1

(Continued)

*Primary Examiner* — Kenneth Rinehart
*Assistant Examiner* — Richard K. Durden
(74) *Attorney, Agent, or Firm* — Ewing & Jones, PLLC (57) ABSTRACT

A gripper assembly for a pipeline plug includes an actuator plate that includes at least two actuator wedges, a bowl that includes at least two bowl wedges, circumferential wedge sets, and gripper units. Each circumferential wedge set and gripper unit is positioned between the actuator plate and the bowl. Each circumferential wedge set includes a first circumferential wedge and a second circumferential wedge. Each circumferential wedge set is positioned such that an actuator wedge and a bowl wedge engage between the first and second circumferential wedges. Each gripper unit includes a gripper body positioned between and abutting a first circumferential wedge of a first circumferential wedge set and a second circumferential wedge of a second circumferential wedge set. Linear compression between the actuator plate and bowl causes circumferential movement of the circumferential wedges, which in turn causes radial expansion of the gripper units.

6 Claims, 13 Drawing Sheets

(56) References Cited

U.S. PATENT DOCUMENTS

| | | | | |
|---|---|---|---|---|
| 2,463,292 A * | 3/1949 | McCallion | B23B 31/4046 | |
| | | | 279/127 | |
| 2,850,101 A * | 9/1958 | Johnston | E21B 33/1216 | |
| | | | 277/338 | |
| 2,901,046 A * | 8/1959 | Webber | E21B 33/1292 | |
| | | | 166/134 | |
| 3,561,490 A | 2/1971 | Little | | |
| 3,746,026 A | 7/1973 | Terring | | |
| 3,986,383 A * | 10/1976 | Petteys | B21D 39/20 | |
| | | | D8/51 | |
| 4,311,196 A * | 1/1982 | Beall | E21B 33/129 | |
| | | | 166/134 | |
| 4,393,929 A * | 7/1983 | Akkerman | E21B 33/1295 | |
| | | | 166/134 | |
| 4,440,223 A * | 4/1984 | Akkerman | E21B 33/1295 | |
| | | | 166/134 | |
| 4,842,082 A * | 6/1989 | Springer | E21B 23/06 | |
| | | | 175/286 | |
| 5,538,173 A * | 7/1996 | Hummel | B23K 37/0531 | |
| | | | 228/44.5 | |
| 6,896,049 B2 * | 5/2005 | Moyes | E21B 29/08 | |
| | | | 166/387 | |
| 7,665,516 B2 * | 2/2010 | Roberts | E21B 23/01 | |
| | | | 166/387 | |
| 7,806,177 B2 * | 10/2010 | Bishop | E21B 33/129 | |
| | | | 166/134 | |
| 7,841,364 B2 | 11/2010 | Yeazel et al. | | |
| 7,866,347 B2 | 1/2011 | Bowie | | |
| 8,267,124 B2 | 9/2012 | Bowie | | |
| 8,307,856 B2 | 11/2012 | Yeazel et al. | | |
| 8,307,891 B2 * | 11/2012 | Bishop | E21B 33/1216 | |
| | | | 166/134 | |
| 8,935,951 B2 | 1/2015 | Bowie | | |
| 9,027,602 B2 | 5/2015 | Bowie | | |
| 9,057,447 B2 | 6/2015 | Bowie | | |
| 9,169,956 B2 | 10/2015 | Bowie | | |
| 9,291,029 B2 * | 3/2016 | Løvslett | E21B 33/1293 | |
| 9,400,076 B2 | 7/2016 | Early et al. | | |
| 9,927,058 B2 * | 3/2018 | Sue | F16L 55/11 | |
| 10,001,220 B2 | 6/2018 | Bowie | | |
| 10,436,372 B2 | 10/2019 | Bjorsvik et al. | | |
| 2011/0259610 A1 * | 10/2011 | Shkurti | E21B 33/12 | |
| | | | 166/318 | |
| 2012/0055667 A1 | 3/2012 | Ingram et al. | | |
| 2018/0119866 A1 * | 5/2018 | Sue | F16L 55/1283 | |

\* cited by examiner

GRIPPER ASSEMBLY FOR PIPELINE ISOLATION TOOL AND METHODS OF USE

CROSS-REFERENCE TO RELATED APPLICATIONS

This application is a nonprovisional application which claims priority from U.S. provisional application No. 63/069,349, filed Aug. 24, 2020, which is incorporated by reference herein in its entirety.

TECHNICAL FIELD/FIELD OF THE DISCLOSURE

The present disclosure relates generally to pipeline tools and specifically to pipeline isolation tools.

BACKGROUND OF THE DISCLOSURE

Pipelines are used to transport liquids and gases over long distances. In some circumstances, a section of the pipeline needs to be isolated from pressure and fluids within the rest of the pipeline. For example, such isolation may be needed while undertaking planned maintenance or emergency repair of the pipeline or equipment associated with the pipeline such as valves. Additionally, such isolation may be needed while pressure testing certain sections of the pipeline.

When isolation of the pipeline is needed, one or more pipeline plugs may be introduced into the pipeline and moved to the desired isolation position. The pipeline plug may be introduced inline and moved through the pipeline to a desired position or may be introduced intrusively through an opened section of the pipeline. Once in position, the pipeline plug may be actuated such that the plug holds itself in place and fluidly isolates the section of the pipeline on one side of the pipeline plug from the section of the pipeline on the other side of the pipeline plug.

SUMMARY

The present disclosure provides for a gripper assembly. The gripper assembly may include an actuator plate, the actuator plate including at least two actuator wedges. The gripper assembly may include a bowl, the bowl including at least two bowl wedges. The gripper assembly may include at least two circumferential wedge sets. Each circumferential wedge set may be positioned between the actuator plate and the bowl. Each circumferential wedge set may include a first circumferential wedge and a second circumferential wedge. Each circumferential wedge set may be positioned such that an actuator wedge and a bowl wedge engage between the first and second circumferential wedges. The gripper assembly may include a gripper unit. The gripper unit may include a gripper body. The gripper body may be positioned between the actuator plate and the bowl. The gripper body may be positioned between and may abut a first circumferential wedge of a first circumferential wedge set and a second circumferential wedge of a second circumferential wedge set.

The present disclosure also provides for a gripper assembly. The gripper assembly may include an actuator plate, the actuator plate including at least two actuator wedges. The gripper assembly may include a bowl. The gripper assembly may include a gripper unit. The gripper unit may include a gripper body, the gripper body positioned between the actuator plate and the bowl. The gripper body may abut the bowl. The gripper body may include at least two bowl wedges. The gripper assembly may include a circumferential wedge set, the circumferential wedge set positioned between the actuator plate and the bowl. Each circumferential wedge set may include a first circumferential wedge and a second circumferential wedge. Each circumferential wedge set may be positioned such that an actuator wedge and a bowl wedge engage between the first and second circumferential wedges.

The present disclosure also provides for a method. The method may include providing a gripper assembly. The gripper assembly may include an actuator plate, the actuator plate including at least two actuator wedges. The gripper assembly may include a bowl, the bowl including at least two bowl wedges. The gripper assembly may include a first circumferential wedge and a second circumferential wedge, each circumferential wedge positioned between the actuator plate and the bowl such that an actuator wedge and a bowl wedge engages the circumferential wedge. The gripper assembly may include a gripper unit, the gripper unit including a gripper body, the gripper body positioned between the actuator plate and the bowl, the gripper body positioned between and abutting the circumferential wedge and the second circumferential wedge. The method may include moving the actuator plate towards the bowl. The method may include moving the first and second circumferential wedges substantially circumferentially toward the gripper body. The method may include moving the gripper body radially outward.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
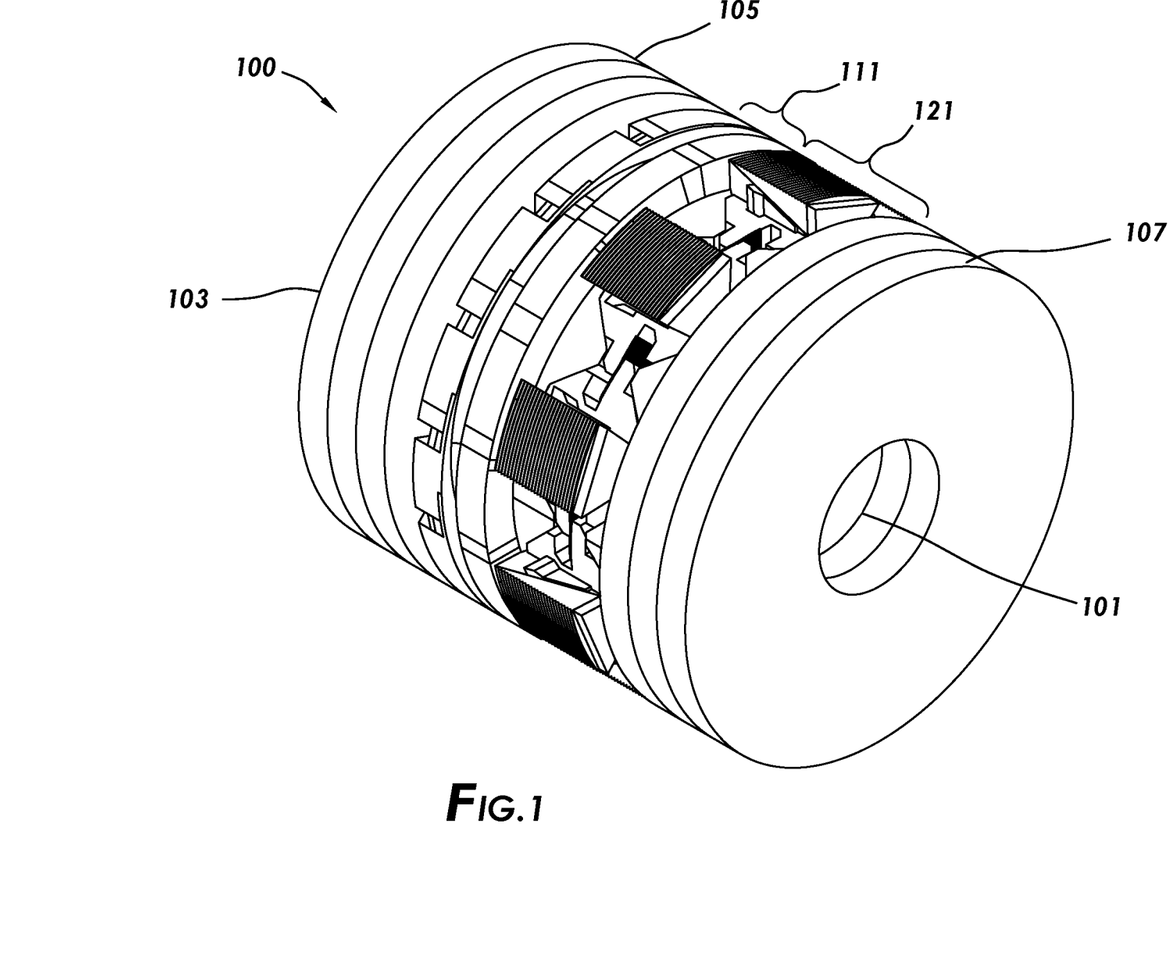
FIG. 1 depicts a perspective view of a pipeline plug consistent with at least one embodiment of the present disclosure.
Figure 2:
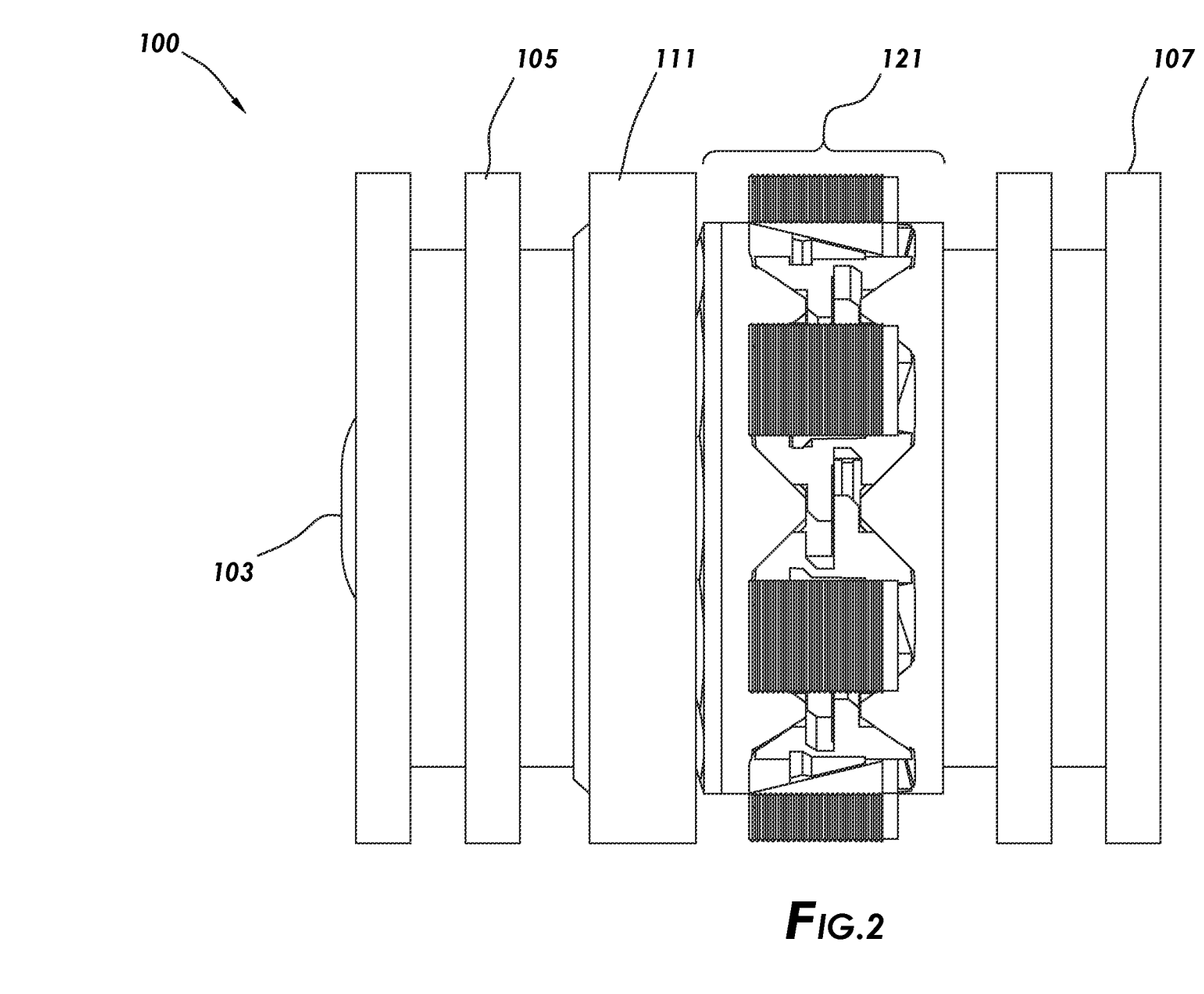
FIG. 2 depicts a side elevation view of a pipeline plug including a gripper assembly consistent with at least one embodiment of the present disclosure.

FIGS. 1 and 2 depict pipeline plug 100 consistent with at least one embodiment of the present disclosure. In some embodiments, pipeline plug 100 may include plug body 101. Plug body 101 may be generally tubular. In some embodiments, pipeline plug 100 may include actuation mechanism 103. Actuation mechanism 103 may include fixed head 105 and movable head 107. In some embodiments, fixed head 105 may be formed as part of or coupled to plug body 101. In some embodiments, movable head 107 may be movable relative to fixed head 105 by, for example and without limitation, hydraulic pressure, pneumatic pressure, or electromechanically. In some embodiments, actuation mechanism 103 may be at least partially positioned within plug body 101.

In some embodiments, pipeline plug 100 may include seal assembly 111. Seal assembly 111 may be annular or tubular in shape and may be positioned about plug body 101. When actuated, seal assembly 111 may engage the pipeline such that seal assembly 111 fluidly isolates the section of the pipeline on one side of seal assembly 111 from the section of pipeline on the other side of seal assembly 111.

In some embodiments, pipeline plug 100 may include gripper assembly 121. Gripper assembly 121 may be annular or tubular in shape and may be positioned about plug body 101. Gripper assembly 121 may be used to maintain the position of pipeline plug 100 within a pipeline. Gripper assembly 121 may include one or more gripping elements that extend radially outward into engagement with the pipeline when in an actuated position as discussed further herein below.

In some embodiments, actuation mechanism 103 may be used to actuate gripper assembly 121 and, in some embodiments, seal assembly 111. In some embodiments, movement of movable head 107 may longitudinally compress gripper assembly 121 and, in some embodiments, seal assembly 111 as further described below.

Figure 3:
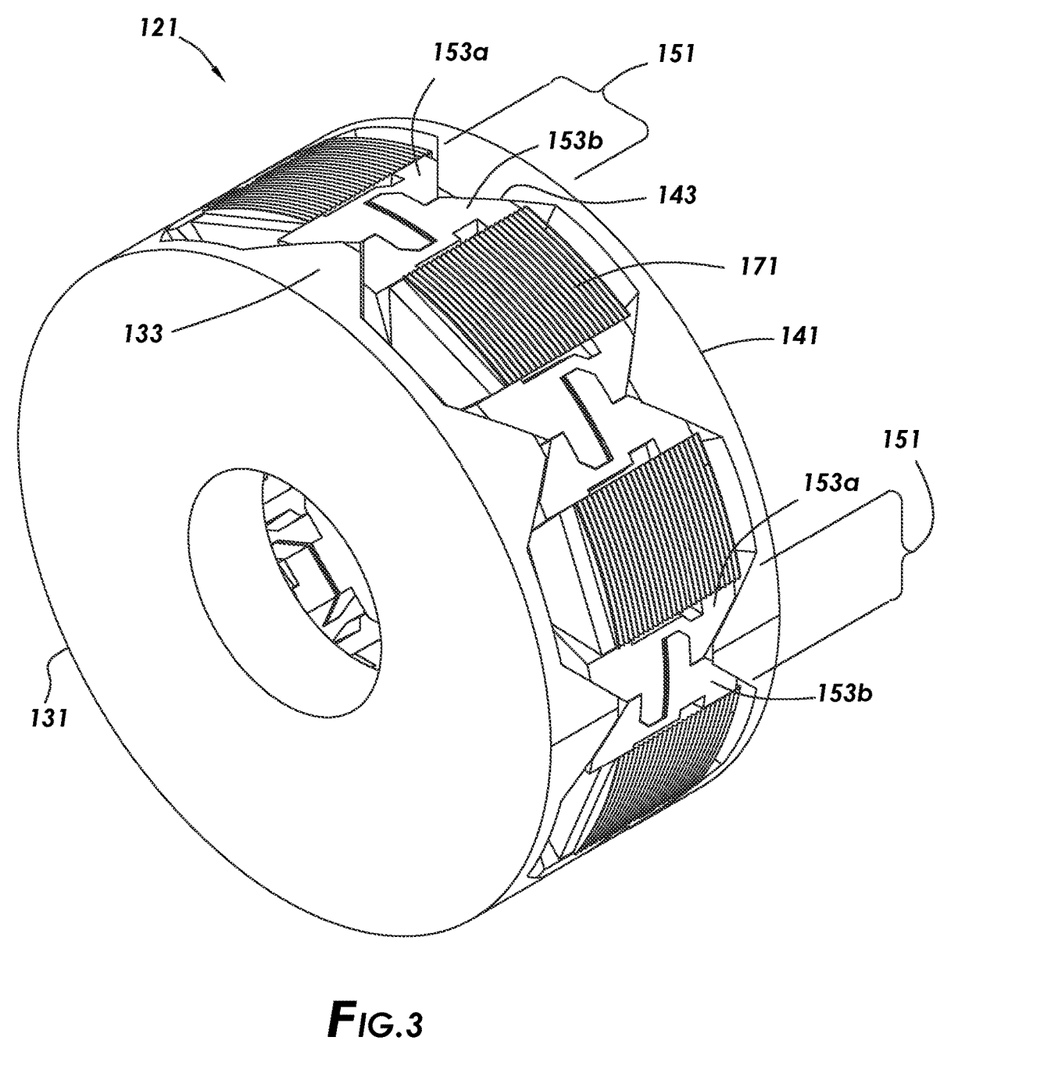
FIG. 3 depicts a perspective view of a gripper assembly consistent with at least one embodiment of the present disclosure in an unset position.

FIG. 3 depicts gripper assembly 121 consistent with at least one embodiment of the present disclosure. In some embodiments, gripper assembly 121 may include actuator plate 131 and bowl 141. Actuator plate 131 and bowl 141 may be compressed longitudinally together by actuation mechanism 103 when gripper assembly 121 is to be engaged.

Figure 3A:
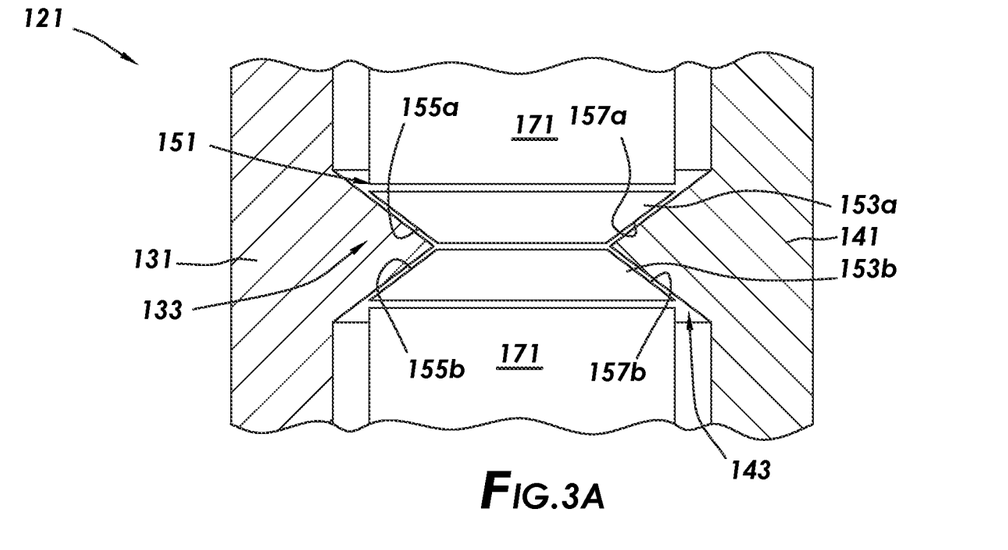
FIG. 3A depicts a partial schematic view of the gripper assembly of FIG. 3.

In some embodiments, gripper assembly 121 may include circumferential wedge sets 151 positioned between actuator plate 131 and bowl 141. Each circumferential wedge set 151 may include first circumferential wedge 153a and second circumferential wedge 153b. In some embodiments, as shown in FIG. 3A, each circumferential wedge set 151 may be aligned with a corresponding actuator wedge 133 and a corresponding bowl wedge 143. In such embodiments, each circumferential wedge set 151 may be positioned such that actuator wedge 133 and bowl wedge 143 are positioned between first circumferential wedge 153a and second circumferential wedge 153b such that linear compression of the space between actuator plate 131 and bowl 141 causes circumferential separation or linear in a substantially circumferential direction separation of first circumferential wedge 153a and second circumferential wedge 153b.

In some such embodiments, first and second circumferential wedges 153a, 153b may include actuator faces 155a, 155b, respectively, and bowl faces 157a, 157b, respectively. Actuator faces 155a, 155b and bowl faces 157a, 157b may abut actuator wedges 133 and bowl wedges 143. In some embodiments, Actuator faces 155a, 155b and bowl faces 157a, 157b may be formed at an angle that corresponds with the angle of actuator wedges 133 and bowl wedges 143, referred to herein as a forcing angle. For the purposes of this disclosure, two angles are considered to correspond if the two angles are, for example and without limitation, within 15°.

Figure 3B:
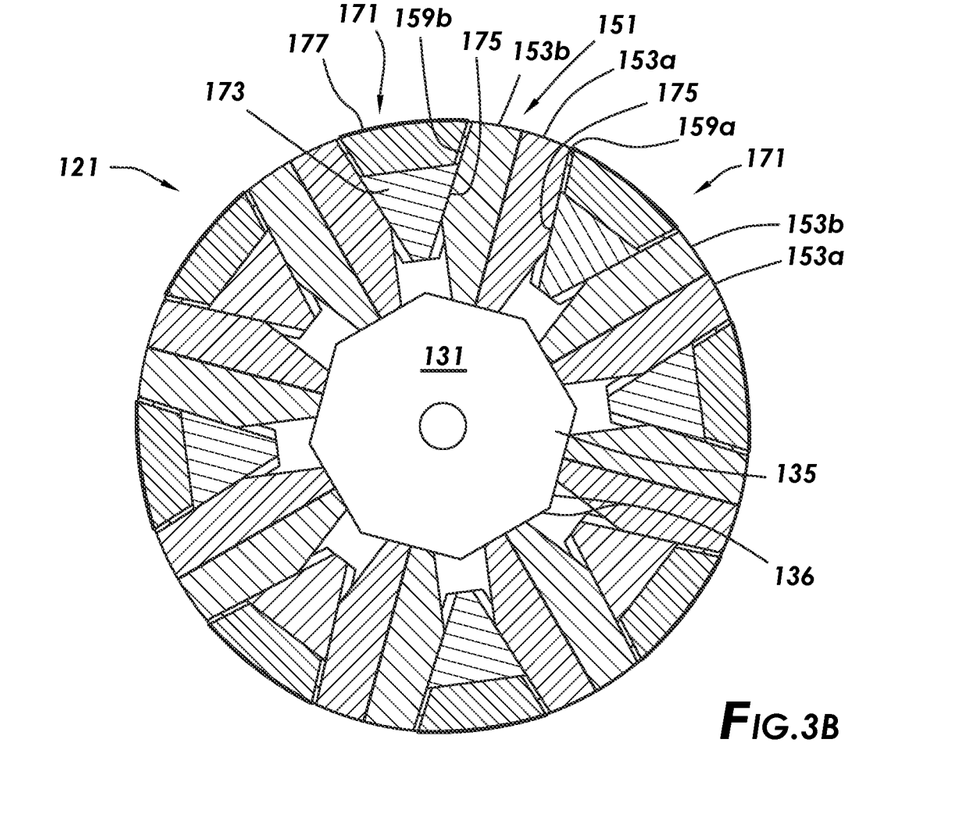
FIG. 3B depicts a cross section view of the gripper assembly of FIG. 3.

In some embodiments, with reference to FIGS. 3, 3B, gripper assembly 121 may include gripper units 171 positioned between actuator plate 131 and bowl 141. Each gripper unit 171 may be positioned such that a circumferential wedge set 151 is positioned circumferentially on either side of gripper unit 171. Each gripper unit 171 may include gripper body 173. In some embodiments, each gripper body 173 may include side faces 175 positioned to abut against expansion faces 159a, 159b of circumferential wedge sets 151 positioned adjacent to gripper body 173. Side faces 175 and expansion faces 159a, 159b may be formed at an angle, defined herein as an expansion angle.

Figure 4:
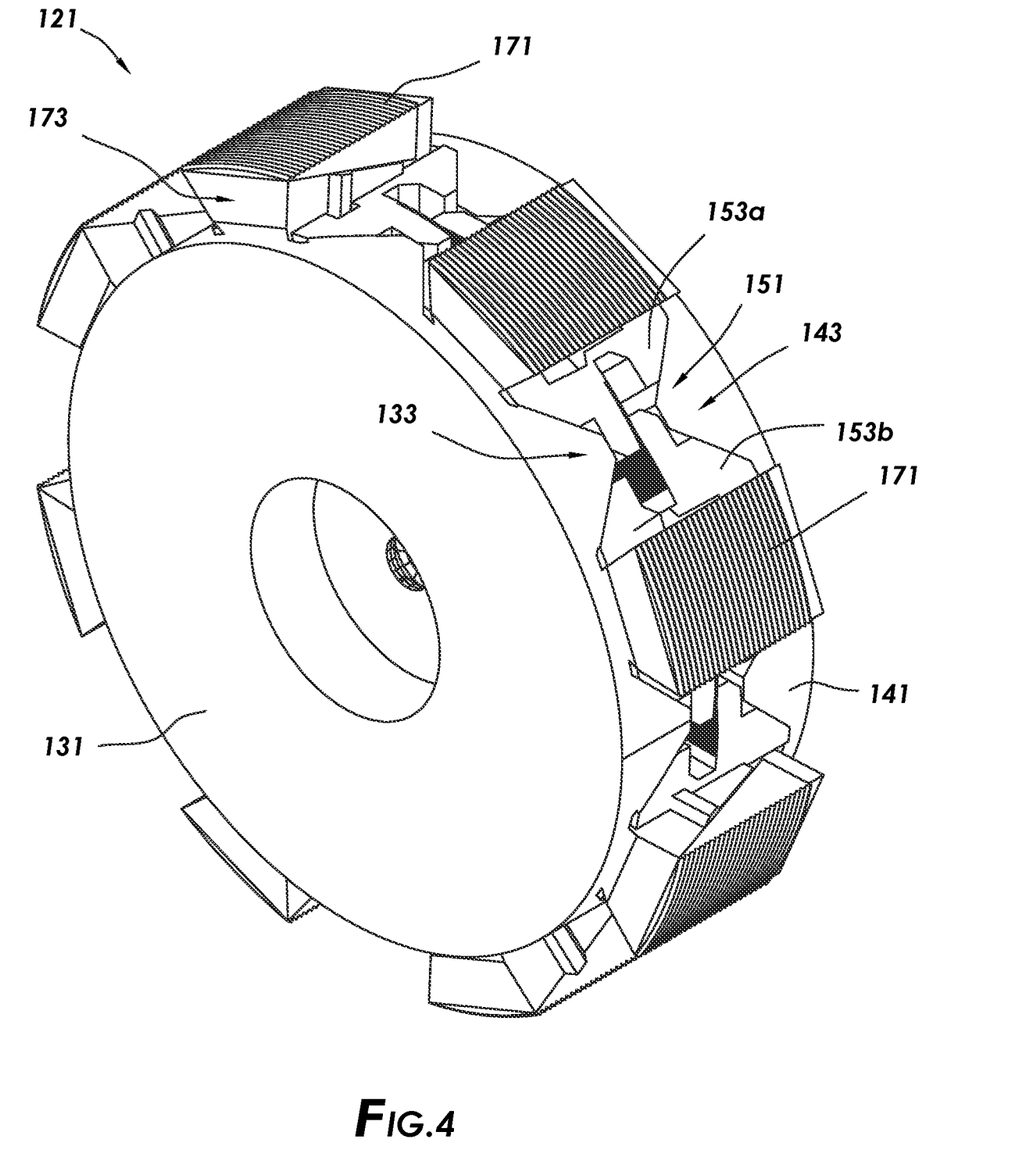
FIG. 4 depicts a perspective view of the gripper assembly of FIG. 3 in a set position.
Figure 4A:
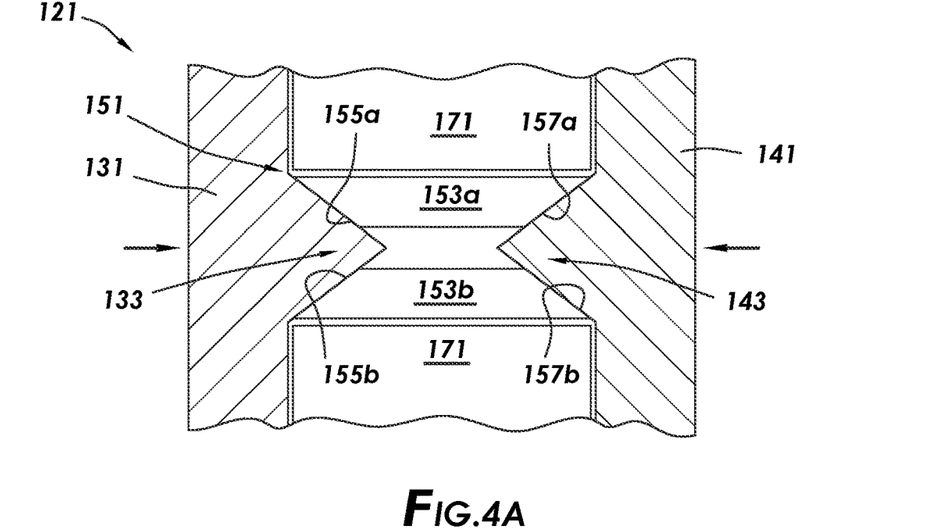
FIG. 4A depicts a partial schematic view of the gripper assembly of FIG. 4.

In such an embodiment, in order to set gripper assembly 121, actuator plate 131 and bowl 141 may be longitudinally compressed by, for example and without limitation, actuation mechanism 103. As actuator plate 131 and bowl 141 move closer together, actuator wedges 133 and bowl wedges 143 may be biased in between first and second circumferential wedges 153a, 153b of each circumferential wedge set 151 thereby forcing first and second circumferential wedges 153a, 153b apart as shown in FIGS. 4, 4A due to the forcing angle formed therebetween. Separation of first and second circumferential wedges 153a, 153b may be circumferential or linear in a substantially circumferential direction.

Figure 4B:
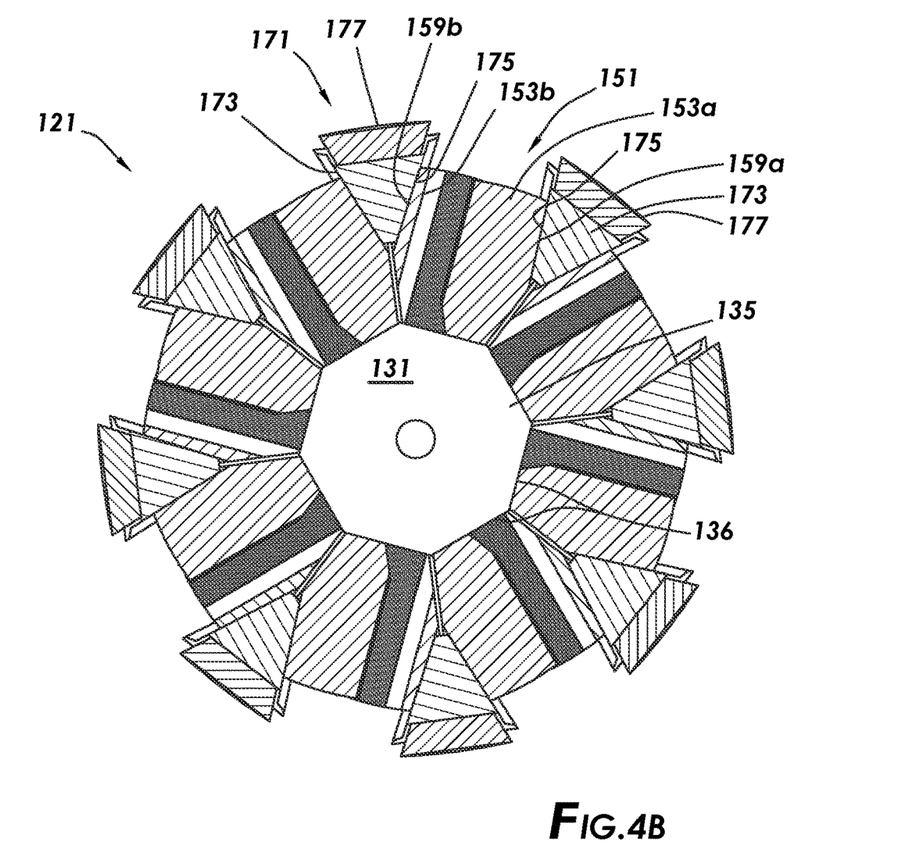
FIG. 4B depicts a cross section view of the gripper assembly of FIG. 4.

As shown in FIG. 4B, as first and second circumferential wedges 153a, 153b of each circumferential wedge set 151 are forced apart, expansion faces 159a, 159b of adjacent circumferential wedge sets 151 move closer together, thereby engaging against side faces 175 of gripper bodies 173 positioned therebetween. Due to the expansion angle formed between expansion faces 159a, 159b and side faces 175 of gripper bodies 173, gripper bodies 173 are forced radially outward and, when positioned within a pipeline, into engagement with the inner wall of the pipeline, thereby holding pipeline plug 100 in place within the pipeline. In some embodiments, the ratio between the radial expansion of gripper bodies 173 and the axial movement of actuator plate 131 and bowl 141 may be, for example and without limitation, between 0.5 and 3.0.

Figure 5:
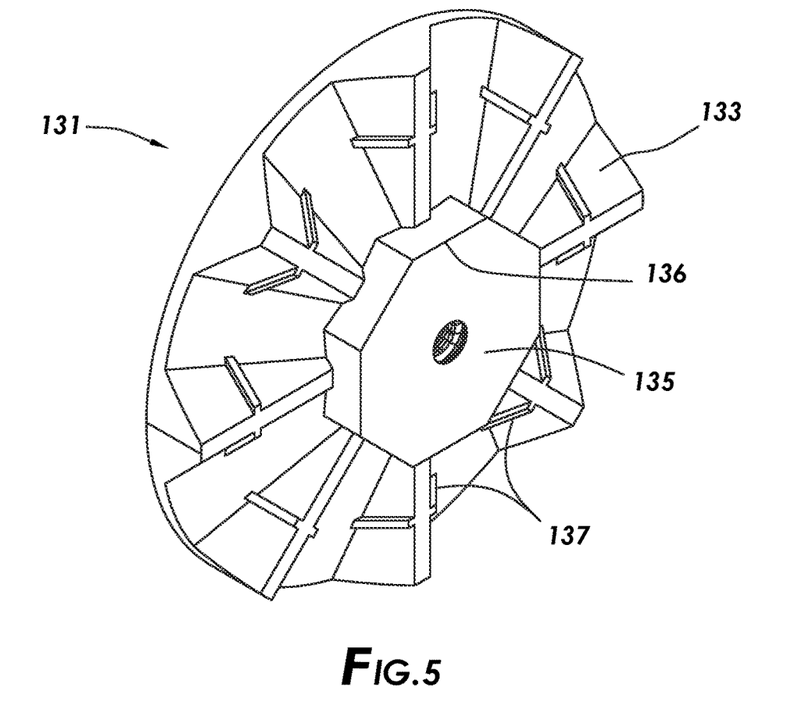
FIG. 5 depicts a perspective view of an actuator plate of a gripper assembly consistent with at least one embodiment of the present disclosure.

FIG. 5 depicts a perspective view of actuator plate 131 consistent with at least one embodiment of the present disclosure that shows actuator wedges 133. In some embodiments, actuator plate 131 may include actuator hub 135. Actuator hub 135 may be a boss positioned radially within actuator wedges 133 such that each actuator wedge 133 corresponds with a face of actuator hub 135, referred to as actuator hub face 136. In some embodiments, actuator hub 135 may be polygonal with flat actuator hub faces 136. In other embodiments, actuator hub faces 136 may be curved.

Figure 6:
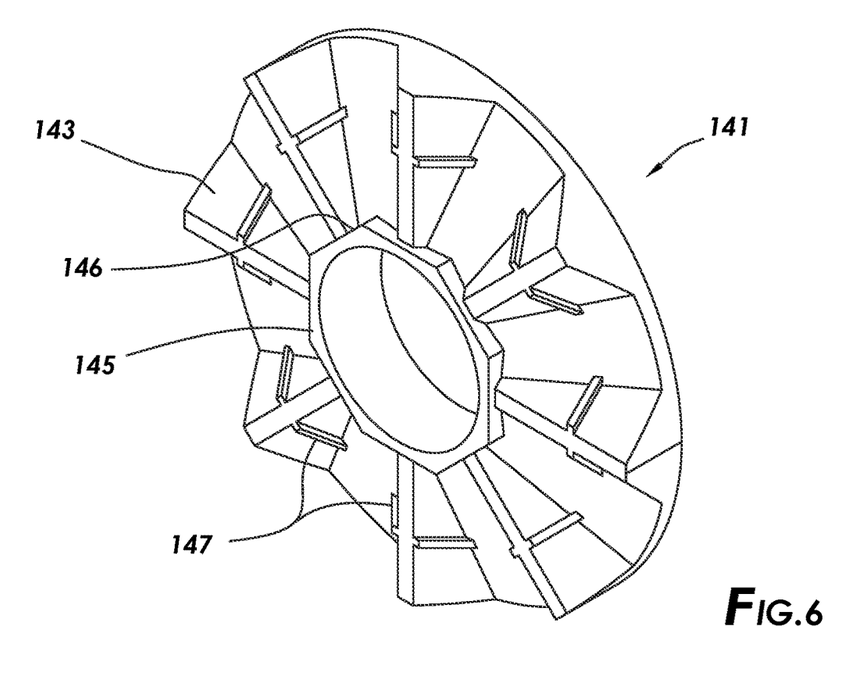
FIG. 6 depicts a perspective view of a bowl of a gripper assembly consistent with at least one embodiment of the present disclosure.

FIG. 6 depicts a perspective view of bowl 141 consistent with at least one embodiment of the present disclosure that shows bowl wedges 143. In some embodiments, bowl 141 may include bowl hub 145. Bowl hub 145 may be a boss positioned radially within bowl wedges 143 such that each bowl wedge 143 corresponds with a face of bowl hub 145, referred to as bowl hub face 146. In some embodiments, bowl hub 145 may be polygonal with flat bowl hub faces 146. In other embodiments, bowl hub faces 146 may be curved.

In such an embodiment, with reference to FIG. 3B and FIG. 4B, each circumferential wedge set 151 may abut a face of actuator hub 135 (and similarly abut bowl hub 145, not shown for clarity) such that radial forces exerted on first and second circumferential wedges 153a, 153b of each circumferential wedge set 151 is transferred to actuator hub 135 and bowl hub 145. First and second circumferential wedges 153a, 153b may abut actuator hub 135 and bowl hub 145 during the full range of motion of first and second circumferential wedges 153a, 153b, i.e. in the unset position shown in FIG. 3B, the set position shown in FIG. 4B, and any intermediary positions.

Figure 7:
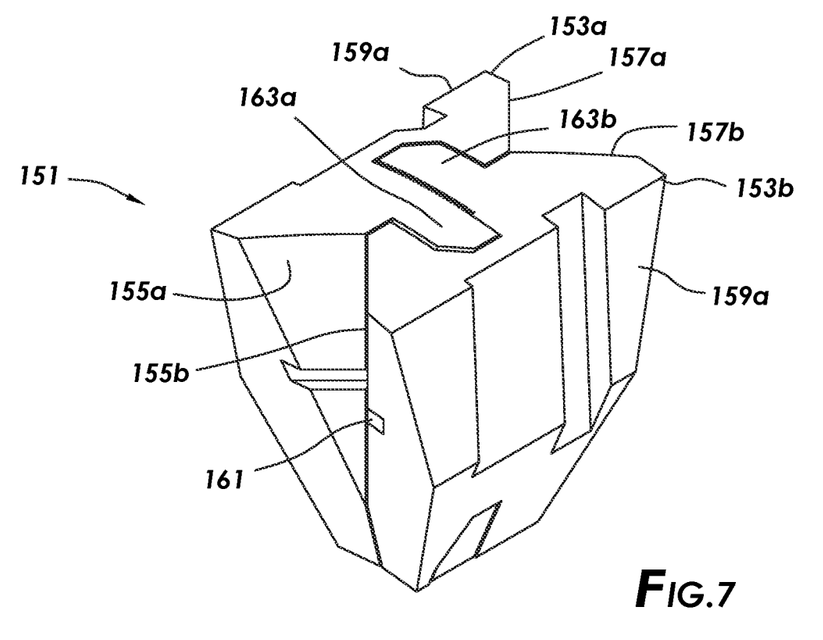
FIG. 7 depicts a perspective view of a set of circumferential wedges of a gripper assembly consistent with at least one embodiment of the present disclosure in an unset position.

In some embodiments, with reference to FIG. 5, actuator plate 131 may include actuator ways 137 positioned on each actuator wedge 133. In some embodiments, with reference to FIG. 6, bowl 141 may include bowl ways 147 positioned on each bowl wedge 143. Actuator ways 137 and bowl ways 147 may extend circumferentially or linearly in a generally circumferential direction. Actuator ways 137 and bowl ways 147 may be positioned to engage alignment grooves 161 formed in first and second circumferential wedges 153a, 153b of each circumferential wedge set 151 as shown in FIG. 7. Actuator ways 137 and bowl ways 147 may, in some embodiments and without being bound to theory, retain circumferential wedge sets 151 to gripper assembly 121, maintain the orientation of each circumferential wedge set 151 relative to actuator plate 131 and bowl 141, and limit motion of circumferential wedge sets 151 to circumferential or substantially circumferential directions during actuation of gripper assembly 121.

Figure 7A:
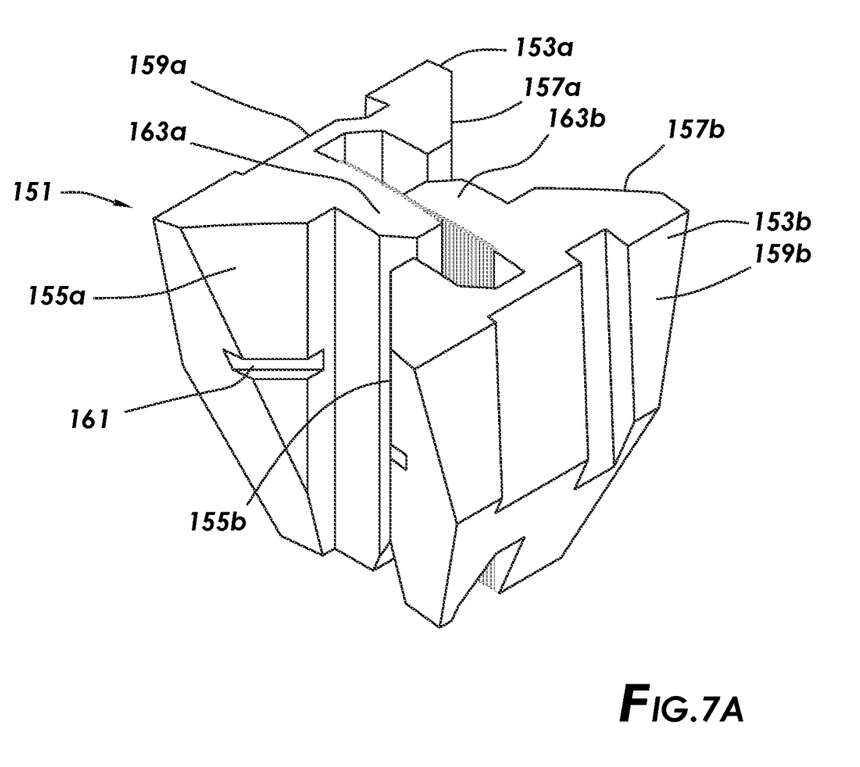
FIG. 7A depicts a perspective view of the set of circumferential wedges of FIG. 7 in a set position.
Figure 7B:
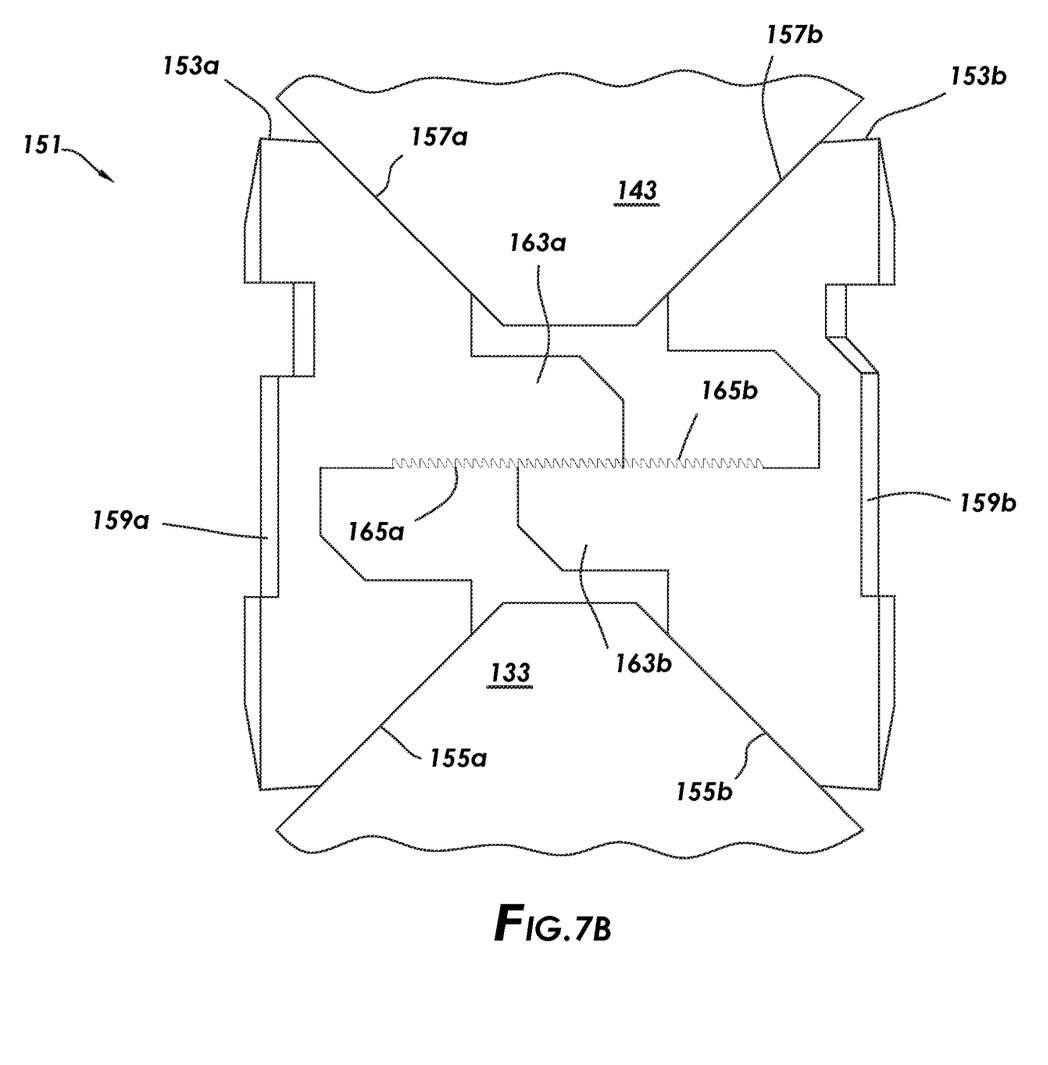
FIG. 7B depicts a top view of the set of circumferential wedges of FIG. 7 in the set position.

In some embodiments, with reference to FIGS. 7, 7A, 7B, first circumferential wedge 153a of each circumferential wedge set 151 may include first interlock rabbet 163a, and second circumferential wedge 153b of each circumferential wedge set 151 may include second interlock rabbet 163b. In some embodiments, each of first and second interlock rabbets 163a, 163b may include interlock teeth 165a, 165b positioned such that interlock teeth 165a of first interlock rabbet 163a engages interlock teeth 165b of second interlock rabbet 163b. Interlock teeth 165a, 165b may be configured in a ratcheting configuration such that interlock teeth 165a, 165b disengage as first and second circumferential wedges 153a, 153b are separated and engage when first and second circumferential wedges 153a, 153b are biased toward each other. Interlock teeth 165a, 165b may therefore, in some embodiments, maintain gripper assembly 121 in the set position.

In some embodiments, first and second interlock rabbets 163a, 163b may be arranged such that a longitudinal force on pipeline plug 100 may disengage interlock teeth 165a, 165b, such as, for example and without limitation, it is desired to unset gripper assembly 121. In other embodiments, first and second interlock rabbets 163a, 163b may be arranged such that a longitudinal force on pipeline plug 100 may engage interlock teeth 165a, 165b. In such an embodiment, interlock rabbets 163a, 163b may be biased apart by a biasing mechanism such that when the longitudinal force on pipeline plug 100 is released, interlock teeth 165a, 165b are disengaged, allowing gripper assembly 121 to be unset. In some embodiments, one or more of actuator ways 137 and bowl ways 147 may interlock with corresponding alignment grooves 161 such that, in some such embodiments, separation of actuator plate 131 and bowl 141 may pull first and second circumferential wedges 153a, 153b apart, thereby allowing interlock teeth 165a, 165b to be disengaged.

Figure 8:
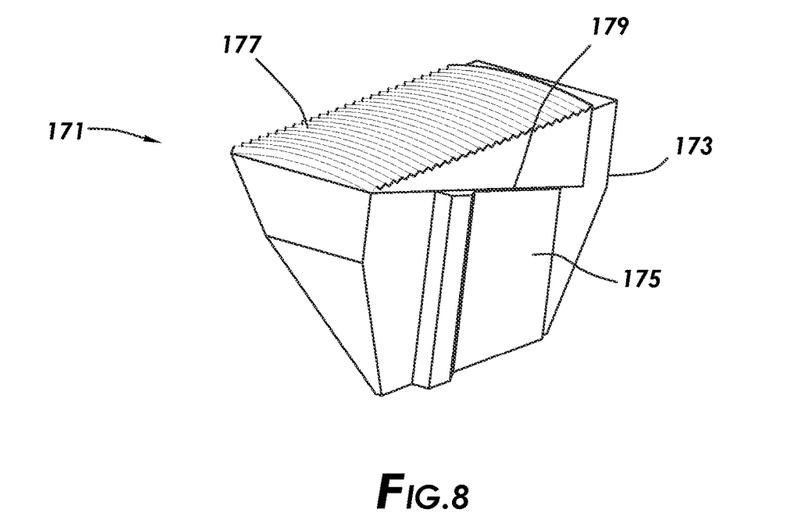
FIG. 8 depicts a perspective view of a gripper unit consistent with at least one embodiment of the present disclosure.
Figure 8A:
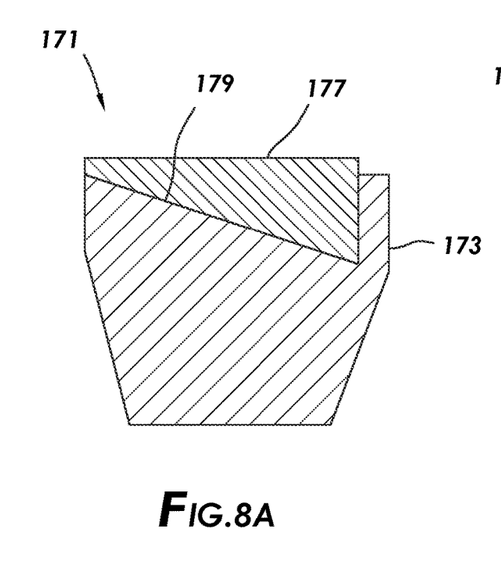
FIG. 8A depicts a cross section view of a gripper unit consistent with at least one embodiment of the present disclosure.
Figure 8B:
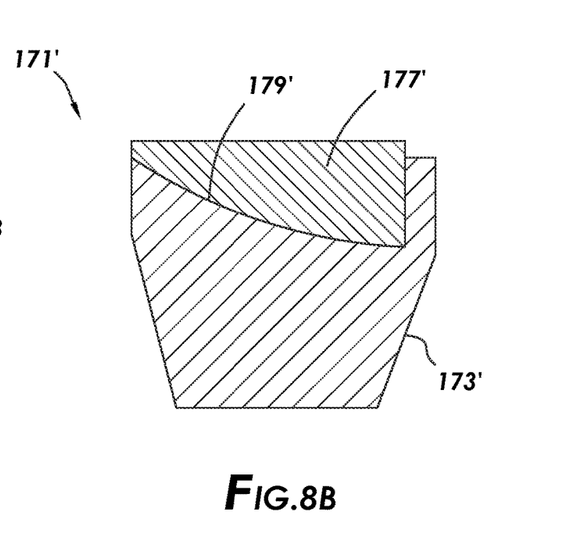
FIG. 8B depicts a cross section view of a gripper unit consistent with at least one embodiment of the present disclosure.

FIG. 8 depicts a perspective view of gripper unit 171 consistent with at least one embodiment of the present disclosure. As discussed above, gripper unit 171 may include gripper body 173 having side faces 175. In some embodiments, gripper unit 171 may include sliding gripper 177. Sliding gripper 177 may abut gripper body 173 at radially outward face 179 of gripper body 173. In some embodiments, sliding gripper 177 may be wedge shaped. In some such embodiments, radially outward face 179 may be formed at an angle as shown in FIG. 8A or may be curved as shown in FIG. 8B (shown as radially outward face 179' of gripper body 173' of gripper unit 171') to correspond with the contour of sliding gripper 177 (or 177' in FIG. 8B). In such an embodiment, longitudinal movement of sliding gripper 177 relative to gripper body 173 may cause sliding gripper 177 to move radially outward from gripper body 173. Such longitudinal movement may, in some embodiments, be caused by longitudinal movement of gripper assembly 121 relative to a pipeline when in the set position.

Figure 9:
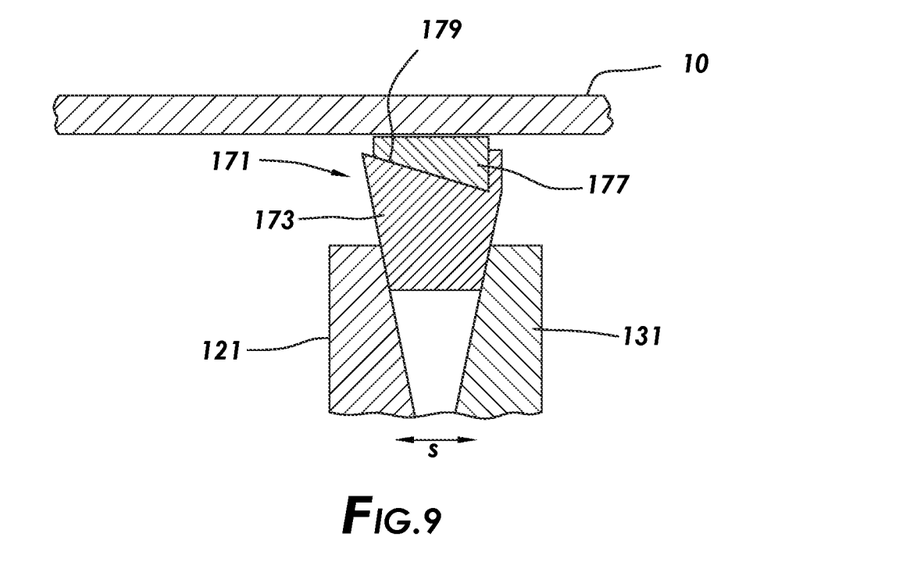
FIG. 9 depicts a partial cross section view of a gripper assembly positioned in a pipeline consistent with at least one embodiment of the present disclosure in the set position.
Figure 9A:
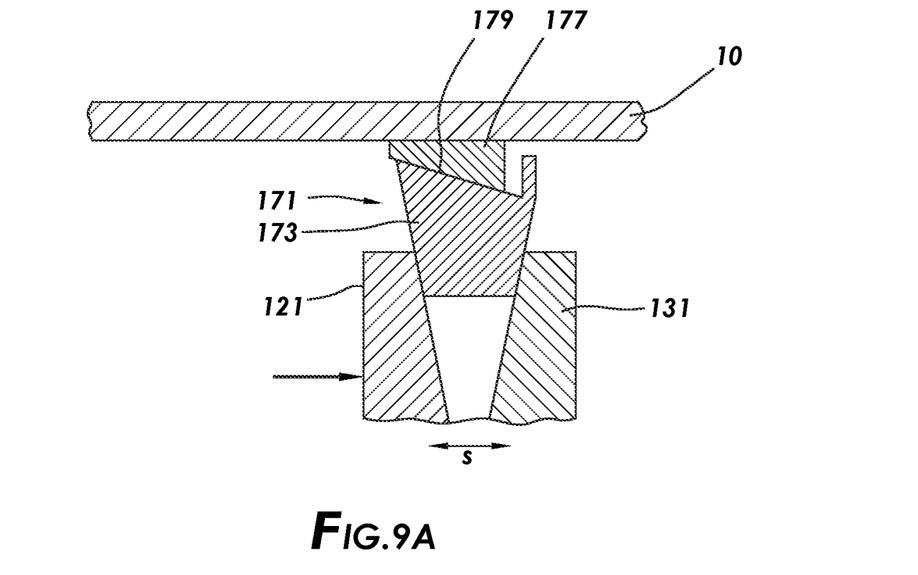
FIG. 9A depicts a partial cross section view of the gripper assembly of FIG. 9 in a further set position.

For example, FIG. 9 shows a cross section of gripper unit 171 positioned within pipeline 10 in the set position. (Actuator plate 131 and bowl 141 are shown for reference, but, as discussed above, may, in some embodiments, not contact gripper unit 171.) Sliding gripper 177, is in contact with pipeline 10. Longitudinal force exerted on pipeline plug 100, such as, for example and without limitation, force caused by a differential fluid pressure across seal assembly 111 of pipeline plug 100, may be transferred to gripper unit 171. As shown in FIG. 9A, sliding gripper 177, in contact with pipeline 10, may remain in place. Any longitudinal displacement of gripper body 173 may, due to the taper (or curvature) of radially outward face 179, cause an increase in force exerted between sliding gripper 177 and pipeline 10, thereby increasing the gripping force exerted on pipeline 10 by gripper assembly 121.

Figure 10:
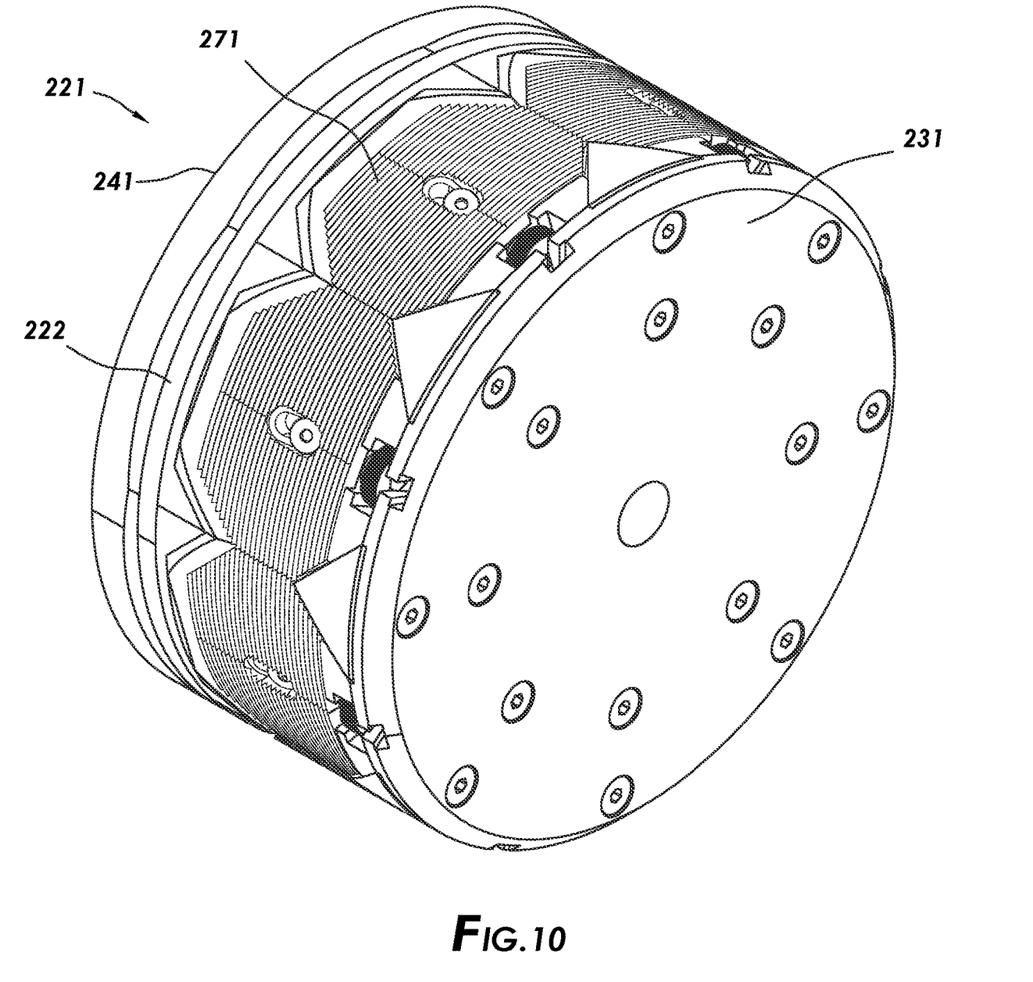
FIG. 10 depicts a perspective view of a gripper assembly consistent with at least one embodiment of the present disclosure.
Figure 11:
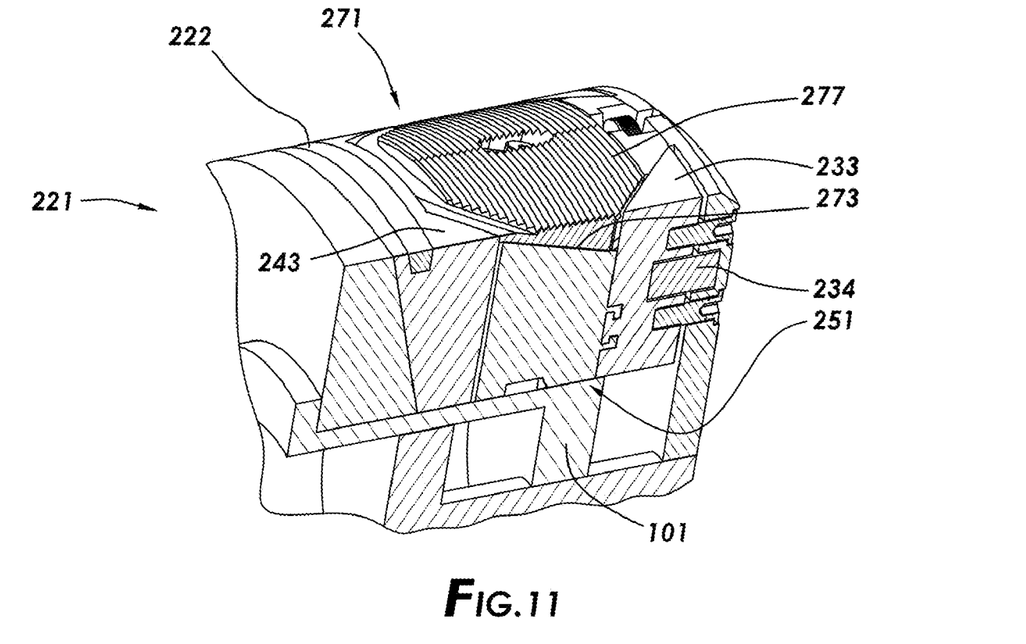
FIG. 11 depicts a partial perspective view of a gripper subassembly of the gripper assembly of FIG. 10.
Figure 12:
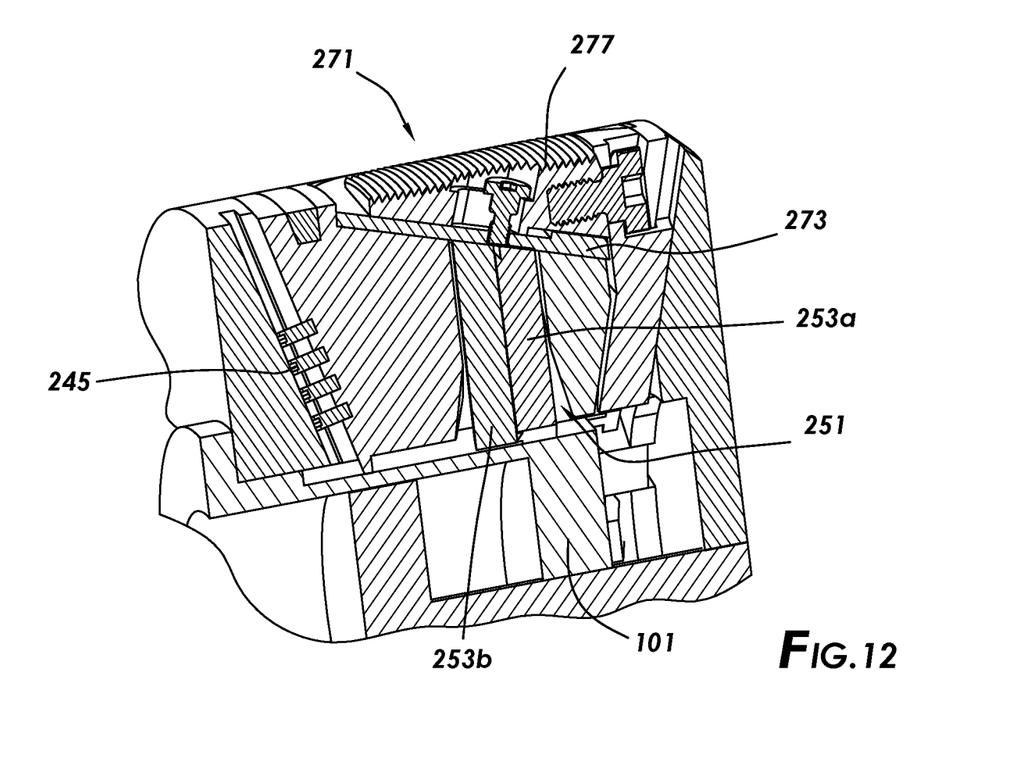
FIG. 12 depicts a cross section view of the gripper subassembly of FIG. 11.

FIGS. 10-12 depict gripper assembly 221 consistent with at least one embodiment of the present disclosure. Similar to gripper assembly 121 described above, gripper assembly 221 may include actuator plate 231, bowl 241, circumferential wedge sets 251, and gripper units 271.

In some embodiments, gripper assembly 221 may include hoop spring 222 positioned about gripper bodies 273 of gripper assembly 221. In such an embodiment, hoop spring 222 may provide a radially inward bias for retracting gripper bodies 273.

In such embodiments, as shown in FIGS. 11, 12, circumferential wedges 253a, 253b of circumferential wedge sets 251 may be positioned radially within gripper units 271. In such embodiments, gripper assembly 221 may operate substantially similarly to gripper assembly 121. However, in such an embodiment, by positioning circumferential wedge sets 251 radially within gripper units 271, the area of sliding grippers 277 and therefore the contact area between gripper assembly 221 and a surrounding pipeline is increased.

In some embodiments, gripper body 273 may directly abut bowl 241. In some such embodiments, bowl wedges 243 may be positioned on gripper body 273 such that circumferential wedge sets 251 are compressed between actuator wedges 233 and bowl wedges 243 formed on gripper body 273 as circumferential wedge sets 251 are positioned radially inward of gripper units 271. In some embodiments, gripper body 273 may be mechanically coupled to bowl 241 by one or more retainers 245 such that gripper body 273 is slidable relative to bowl 241.

In some embodiments, one or more of actuator wedges 233 may be spring-loaded to actuator plate 231. In such an embodiment, wedge spring 234 may be positioned between actuator wedges 233 and actuator plate 231 such that the bias force provided by wedge spring 234 engages interlock teeth of circumferential wedge sets 251. In some such embodiments, the circumferential expansion of each circumferential wedge set 251 may not rely on forces provided by adjacent circumferential wedge sets.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A gripper assembly comprising:
   an actuator plate, the actuator plate including at least two actuator wedges;
   a bowl, the bowl including at least two bowl wedges;
   at least two circumferential wedge sets, each circumferential wedge set positioned between the actuator plate and the bowl, each circumferential wedge set including a first circumferential wedge and a second circumferential wedge, each circumferential wedge set positioned such that an actuator wedge and a bowl wedge engage between the first and second circumferential wedges; and
   a gripper unit, the gripper unit including a gripper body, the gripper body positioned between the actuator plate and the bowl, the gripper body positioned between and abutting a first circumferential wedge of a first circumferential wedge set and a second circumferential wedge of a second circumferential wedge set.

2. The gripper assembly of claim 1, wherein each of the first and second circumferential wedges includes an interlock rabbet.

3. The gripper assembly of claim 2, wherein each interlock rabbets includes interlock teeth positioned such that the interlock teeth of the interlock rabbets of the first and second circumferential wedges are in a ratcheting configuration such that the interlock teeth disengage as the first and second circumferential wedges are separated and engage when the first and second circumferential wedges are biased toward each other.

4. The gripper assembly of claim 1, wherein the gripper unit further comprises a sliding gripper, the sliding gripper being wedge-shaped, the sliding gripper slidingly coupled to the gripper body at a radially outward face of the gripper body.

5. The gripper assembly of claim 4, wherein the radially outward face is formed at an angle or is curved.

6. A method comprising:
   providing a gripper assembly, the gripper assembly including:
      an actuator plate, the actuator plate including at least two actuator wedges;
      a bowl, the bowl including at least two bowl wedges;
      at least two circumferential wedge sets, each circumferential wedge set positioned between the actuator plate and the bowl, each circumferential wedge set including a first circumferential wedge and a second circumferential wedge, each circumferential wedge set positioned between the actuator plate and the bowl such that an actuator wedge and a bowl wedge engage between the first and second circumferential wedges; and
      a gripper unit, the gripper unit including a gripper body, the gripper body positioned between the actuator plate and the bowl, the gripper body positioned between and abutting a first circumferential wedge of a first circumferential wedge set and a second circumferential wedge of a second circumferential wedge set;
   moving the actuator plate towards the bowl;
   moving the first circumferential wedge of the first circumferential wedge set and the second circumferential wedge of the second circumferential wedge set substantially circumferentially toward the gripper body; and
   moving the gripper body radially outward.

* * * * *